INVENTORS
MILTON C. BUDDE
FRANK J. ZUMAQUERO

United States Patent Office 3,226,822
Patented Jan. 4, 1966

3,226,822
ART OF BONDING CERAMIC TO METAL
Milton C. Budde, Sunnyvale, and Frank J. Zumaquero, San Jose, Calif., assignors to Eitel-McCullough, Inc., San Carlos, Calif., a corporation of California
Filed Sept. 27, 1961, Ser. No. 141,100
4 Claims. (Cl. 29—473.1)

This invention relates to methods of bonding ceramics to metals, and to the materials for effecting such bonds. More particularly, the invention relates to the utilization of a novel alloy in conjunction with oxygen-free high-conductivity copper to achieve superior bonding between the alloy and an associated ceramic body.

In the last decade, a great deal of research has been conducted in an attempt to optimize techniques and materials useful in bonding ceramic to metal. Of particular usefulness in the electronics industry is the practice of bonding dissimilar materials such as aluminum oxide and beryllium oxide bodies to such metals as copper, nickel, iron or alloys thereof, by the bonding technique of brazing.

It is not commercially feasible at present to indiscriminately braze ceramic bodies directly to metal in a single operation. In practice, the ceramic surface to be brazed is provided with a tightly adherent auxiliary metal coating or surface composed of sintered metal particles. One method of applying such a metalizing layer is described in detal in United States Patent No. 2,780,561, the description of which is incorporated herein by reference. That patent describes a method of providing a metalized coating on a ceramic body by coating a portion of the ceramic with manganese molybdate and then firing the coated ceramic in an oxidizing atmosphere at a temperature of about 1100° C., and subsequently firing the ceramic in a reducing atmosphere at a temperature of about 1250° C. As described in the aforementioned patent, one of the important factors of the metalizing procedure is that a "glassy" phase be produced near the surface of the ceramic with which the metal particles integrally intermingle. As stated in the patent, this glass-like transition layer includes constituents of the ceramic as well as those of the coating material. This "glassy" phase will hereafter be referred to herein as the "reactant" phase in which particles of the metalizing compound are enveloped by a constituent of the ceramic material.

It has been recognized that for better yields in brazing ceramic to metal there should be a dense layer of tightly adherent metal on the ceramic to which the associated structure may adhere. Stated in another way, it is desirable that the braze material be capable of wetting the material to which it must adhere, but it is preferred that the braze material not enter into solution or alloy with the metalizing layer on the ceramic body and thus form an intermetallic compound which experience has shown is normally brittle and would subject the metalized layer or interface to severe stresses. Another disadvantage of such alloying of the braze material with the metalizing layer is that fissures are created within the metalizing layer extending to the ceramic surface or interface, thus weakening the bond between metalizing and ceramic or destroying the bond entirely.

To this end, again as disclosed in the above-mentioned patent, the initial metalized layer is plated with either copper or nickel. This plating is effected after the metalizing but before the brazing operation, and is effected in a manner to prevent alloying of the plate with the metalized layer. It has heretofore been though that this layer of plate prevented the braze material from attacking the metalized layer underneath, but we have found this to be not true, especially where certain commonly used materials are involved. Little or no attention has been given to this problem of the detrimental affinity of one material for another, especially at temperatures at or near which all are or tend to be liquids. It is therefore the broad object of this invention to provide a "package" of materials, or "package concept" as it were, including materials which cooperate one with the other to ensure reliable ceramic-to-metal seals.

An important factor in the provision of reliable ceramic-to-metal seals by the brazing technique is that the union be as nearly homogeneous as possible. This requires that there be a substantial reactant phase between the ceramic and metalized layer to provide adherence of the sintered metalized layer on the ceramic body. It also requires the use of materials between the metalized layer and the associated metalized surface or metal body which will suitably wet but not dissolve or erode the metalizing, and which will alloy with the metal body at a predetermined temperature to form a solid solution. It is therefore another object of the invention to provide a combination of materials associated in a manner to provide a homogeneous braze between a ceramic body and a metal body.

Another important factor in the provision of a reliable ceramic-to-metal seal is that the metal body and braze material being utilized have crystalline structures which arrange themselves as continuations of each other at brazing temperature. It is accordingly a still further object of the invention to associate a braze material with a metal body under conditions which will result in the crystals of the braze material being arranged in a pattern which is a continuation of the pattern of arrangement of the crystals of the metal body.

In the formation of ceramic-to-metal seals it is also important that consideration be given to the specific composition of the ceramic body sought to be brazed. It has been found that different ceramic compositions must be considered individually, and that processes effective to produce a reliable vacuum seal with one ceramic composition may be wholly ineffective to produce a reliable vacuum sea with another composition. It is therefore another object of the invention to provide a process and combination of materials applicable to at least two different polycrystalline ceramic compositions, such as $Al_2O_3$ and $BeO$, both found to be especially useful for vacuum wall or other applications in the electronics industry.

The invention possesses other objects and features of value, some of which, with the foregoing, will become apparent from the following description and the drawings. It is to be understood, however, that the invention is not limited to the particular method or means illustrated and described, but may be embodied in various forms within the scope of the appended claims.

Broadly considered, the invention includes two different aspects, the first of which involves the combination of materials of a type and in a manner which, when heated to a predetermined temperature, will cooperate to produce a homogeneous brazed union therebetween. In its second aspect the invention contemplates utilization of brazing conditions, including temperatures and atmospheres which will consistently produce a high percentage of reliable homogeneous brazed unions between ceramic and metallic bodies. With respect to materials, the invention contemplates the use of ceramic bodies of aluminum oxide or beryllium oxide in conjunction with a novel metallic alloy of copper and nickel having thermal expansion and contraction characteristics compatible with the ceramic body. The ceramic body is conveniently provided with a metalized layer composed of $MoO_3$, $MnO_2$ and $TiO_2$, as described in U.S. Patent 2,996,401, issued August 15, 1961, the description of which is incorporated herein by reference. The metalized area of the ceramic body may be copper plated and then brazed to the associated metallic surface or metallic body by means of oxygen-free, high-conductivity copper braze material. Brazing is preferably effected at a temperature in the range of 200° C.–300° C. below the sintering temperature of the material forming the metalizing.

Referring to the drawings:

FIGURE 1 is an enlarged cross-sectional view illustrating schematically the preferred arrangement of materials for the production of a homogeneous brazed union of a ceramic to a metal surface. Thicknesses are exaggerated as required for clarity.

FIGURE 2 is a view comprising a photomicrograph illustrating the cooperative relationship between the materials arranged as in FIGURE 1, but after being heated to brazing temperature and then cooled. Magnification is 200 times. The photomicrograph clearly illustrates the homogeneous nature of the union, the complementary crystal arrangement between metallic body and braze material, and complete absence of erosion of the metalizing layer by the braze material.

Figure 3A:
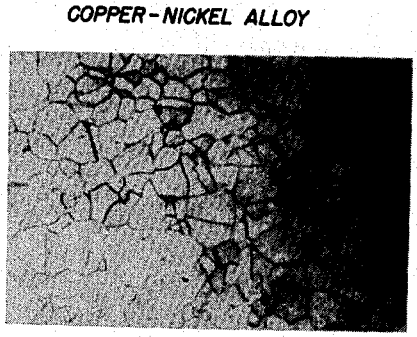
FIGURE 3A is a view comprising a photomicrograph of a sectioned portion of a preferred copper-nickel alloy.
Figure 3B:
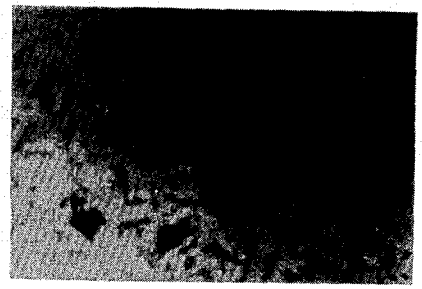
FIGURE 3B is a view comprising a photomicrograph of a sectioned portion of a preferred ceramic body.

In terms of greater detail, it has been discovered that in brazing certain ceramics to an associated metallic surface or body, better and more consistent results are obtained when materials are used which are compatible at the temperature at which brazing occurs. Ceramic materials we have found satisfactory for vacuum wall applications in electron tubes include $Al_2O_3$ (aluminum oxide) sold by the Coors Porcelain Company under the trade designations AD–94 and AD–96, and BeO (beryllium oxide) sold by the Coors Porcelain Company under the trade designations BD–96 and BD–98. The AD–94 ceramics, as shown magnified 400 times in FIGURE 3B, are characterized in that they contain at least 93% $Al_2O_3$, while the AD–96 ceramics contain at least 95.5% $Al_2O_3$. Thermal expansion of each at 1100° C. is 11 and 11.1 mils/in., respectively.

Considerable effort has been expended by numerous companies and laboratories in attempts to determine the adherence mechanism of sintered metals to ceramic surfaces. It is believed, for instance, that a tightly adherent metalizing layer, say of $MoO_3$-$MnO_2$ and $TiO_2$ as disclosed in U.S. Patent 2,996,401, depends upon the sintering of the molybdenum in the presence of a reacted liquid phase present at about 1425° C. Adherence and wetting of the molybdenum particles by the liquid or reactant phase of the ceramic is necessary to produce good adherence of the metalizing layer on the ceramic. Generally the bonding mechanism depends on a critical interaction of physical and chemical forces in the interface.

We have found that even when excellent initial adherence of the metalizing layer to the ceramic body has been achieved, poor and unreliable brazes result if braze materials are used which are non-compatible with the materials forming the metalizing layer. Some of the more commonly used braze materials, such as those sold under the trade designations Copper-Silver BT, Nicoro 80 and Nicoro, have been found to have deleterious effects on the metalizing layer at the elevated brazing temperatures desirable in the electronics industry.

Many brazes utilizing these materials and effected under closely controlled conditions, with subsequent photomicrographic examination of the brazes, have revealed that commencing at about 900° C. and increasing thereafter these braze materials attack and erode the metalizing layer and pass therethrough into contact with the ceramic body. Plating the metalizing layer with copper or nickel does not appear to diminish such destructive erosion of the metalizing layer. In fact, with nickel such erosion is accelerated. However, it does provide a surface more readily wettable than the Mo-Mn-Ti metalizing layer, and it does tend to prevent oxidation of the metalizing layer during storage of metalized ceramics.

In addition to being compatible with the metalizing layer, either plated or unplated, the braze material should also be compatible with the metallic surface or body to be adhered to the ceramic. In this regard, we have found that the metallic surface or body should preferably be formed of an alloy of copper and nickel compounded especially for use in electron tube applications where thermal expansion and contraction, melting point, strength, and compatibility with other materials are of prime importance. The composition of such alloy consists of a minimum of 68% copper, 28–32% nickel, a maximum of .50% manganese and .40% iron, and no more than trace amounts of zinc, lead and tin. This alloy is shown magnified 300 times in FIGURE 3A and possesses a recrystallized nominal grain size of .045 mm. and a thermal expansion rate of only 17.0 mils/in. at 1100° C.

From this it will be seen that this alloy has particular utility in the electronics industry due to the relatively low differential of thermal expansion and contraction in comparison to ceramic, and its relatively high thermal and electrical conductivity, low yield strength and other characteristics in comparison with other metals.

To braze this copper-nickel alloy to ceramic bodies of the types previously discussed, we have found that braze material formed from oxygen-free, high-conductivity copper is especially useful. This braze material possesses excellent wetting and flow characteristics on the metalizing layer but exhibits minimum alloying or eroding reaction with the metalizing layer. Compatibility of this braze material is further assured by the fact that it exhibits sufficient ductility during and after solidification to relieve stresses set in the joint during the brazing operation. Additionally, oxygen-free, high-conductivity copper when used as the braze material does not form the objectionable brittle intermetallic compound with the metalizing layer or metallic surface or body. In fact, it is known that copper and molybdenum form a miscibility gap in the liquid state ranging from 0 to 100% molybdenum, and that the solid solubility of molybdenum in copper at 900° C. is almost nil.

Figure 1:
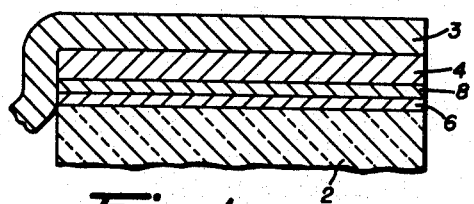
Figure 4:
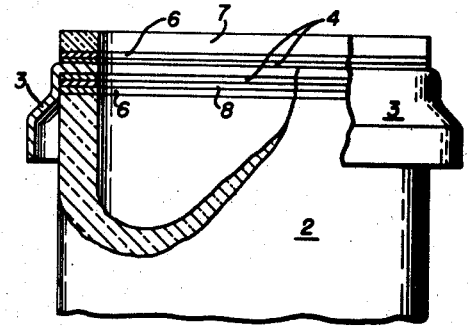
FIGURE 4 is an elevational view partly in vertical section illustrating a portion of a brazed electron tube subassembly utilizing the arrangement shown in FIGURE 1. The layers of braze material, plate and metalizing are exaggerated in thickness for clarity, but similar parts are designated by like reference numerals.
Figure 2:
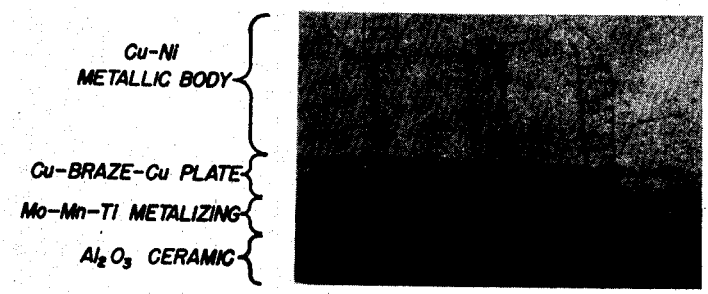

It has been found that when the foregoing materials are contiguously arranged, as shown in FIGURES 1 and 4, and subsequently raised to just above the liquidus temperature (1083° C.) of the oxygen-free, high conductivity copper, the copper braze material will alloy with the copper plate adherent on the metalizing layer, but will not attack or erode the metalizing layer. This is graphically illustrated in the photomicrograph of FIGURE 2.

The copper braze material will also alloy with the copper-nickel metallic surface or body to such an extent that the crystals of the braze material arrange themselves in patterns which constitute continuations of the pattern of crystal arrangement in the copper-nickel metallic member. This result is achieved because copper and nickel exhibit complete solubility from 0/100% and both have face-centered cubic crystal structures with atomic radii in Angstrom units of 1.28 and 1.24, respectively. Thus, brazing, under the conditions specified, will assure a gradient chemical composition closely approximating the composition of the metal member by providing a lattice parameter varying with atomic concentration from 3.60 KX units to 3.52 KX units, yet exhibiting no phase changes due to limited solid solubility or presence of invariant points. This cooperative relationship between the crystals of the braze material and metallic surface or body does not occur where copper-silver, "Nicoro" or binary and ternary gold alloy braze materials are substituted for the oxygen-free, high-conductivity copper braze material. For purposes of definition, an X unit is a unit of measurement used in crystallography, and a thousand X units are designated when X is used with the letter K. An X unit is smaller than an Angstrom unit by a factor of 1.00202.

In FIGURE 4 is illustrated an end portion of a hollow ceramic cylinder 2, preferably formed from $Al_2O_3$ or BeO, and provided with a metallic sealing ring 3 brazed on one end of the cylinder. The sealing ring is fabricated from sheet stock of the alloy of copper-nickel having the composition discussed above, and is brazed to the metalizing layer 6 on the ceramics 2 and 7 by the interposition of rings 4 of braze material formed from oxygen-free, high-conductivity copper as previously discussed. To increase the wettability of the metalizing layer by the copper braze material, a layer 8 of copper plate is adhered to the metalizing layer prior to brazing, although under certain circumstances the layer of plate may be omitted.

We have found that very satisfactory brazes are achieved by stacking the metalized and plated ceramic with the ring of brazing material and the copper-nickel sealing ring in a sealed retort charged with dry hydrogen (−80° F. Dew Point) and preheating the retort to a temperature of about 1050–1060° C. This temperature is held substantially constant for about fifteen minutes. Preheating in this manner results in equalization of the temperature of the various elements of the combination at just below the brazing temperature. The temperature is then raised to about 1115° C. and held for about six minutes to effect the braze. The brazed unit is then cooled to room temperature while still sealed within the retort, after which the retort is opened and the brazed assembly removed.

Satisfactory brazes have also been produced in a furnace provided with a hydrogen atmosphere having a dew point of 20°–30° F. In this type of equipment the assembly is preferably preheated for twenty minutes at 1050–1060° C. The temperature is then raised to 1110° C. and held for ten minutes to effect brazing. The assembly is cooled for one hour or to a temperature of about 200° C. before removal from the furnace.

We claim:

1. The method of producing a homogeneous bond between a dielectric body formed of metallic oxide having a metallic surface thereon consisting of two or more materials selected from the group consisting of molybdenum, manganese, tungsten, rhenium, titanium, tantalum, silicon, the oxides thereof, or combinations of said materials and/or their oxides, and an associated metallic body consisting of an alloy of copper and nickel in the proportion of about 70% copper and 30% nickel, comprising the steps of interposing between said metallic surface and the associated metallic body a layer of oxygen-free, high-conductivity copper, heating the assembly to a liquidus temperature at which the pattern of crystal arrangement of said oxygen-free, high-conductivity copper forms a continuation of the pattern of crystal arrangement of the copper-nickel alloy, and then cooling the assembly so formed.

2. The method according to claim 1, in which a layer of copper is plated on said metallic surface prior to the interposition of said layer of oxygen-free, high-conductivity copper.

3. The method of producing a homogeneous bond between a dielectric body formed from a metal oxide selected from the group consisting of aluminum oxide, beryllium oxide and magnesium oxide and having a metallic surface thereon and an associated body having a metallic surface consisting of a copper-nickel alloy, comprising the steps of depositing a first layer of copper on said metallic surface of the dielectric body, interposing between said deposited copper layer and the metallic surface of said associated body a second layer of copper, heating the assembly to a liquidus temperature at which the pattern of crystal arrangement of said second copper layer is a continuation of the pattern of the crystal arrangement of the metal alloy forming the metallic surface of said associated body and which does not dissolve or erode the metallic surface of the dielectric body, and then cooling the assembly so formed.

4. The method according to claim 3, in which said copper-nickel alloy consists of about 70% copper and 30% nickel.

References Cited by the Examiner

UNITED STATES PATENTS

| | | | |
|---|---|---|---|
| 2,163,408 | 6/1939 | Pulfrich | 29—473.1 X |
| 2,394,984 | 2/1946 | Claussen. | |
| 2,564,738 | 8/1951 | Tank | 29—472.9 |
| 2,776,472 | 1/1957 | Mesick | 189—36.5 X |
| 2,780,561 | 2/1957 | La Forge | 117—62 |
| 2,798,577 | 7/1957 | La Forge | 29—195 X |
| 2,799,081 | 7/1957 | Farnham | 29—195 |
| 2,957,238 | 10/1960 | Harvey | 29—472.9 |
| 2,996,401 | 8/1961 | Welch | 117—22 |
| 3,019,515 | 2/1962 | Whitehurst | 29—195 |
| 3,023,492 | 3/1962 | Briston | 29—198 X |

HYLAND BIZOT, *Primary Examiner.*

DAVID L. RECK, *Examiner.*